United States Patent
Jihn et al.

(10) Patent No.: US 10,417,573 B2
(45) Date of Patent: Sep. 17, 2019

(54) GOAL-ATTAINMENT ASSESSMENT APPARATUS AND METHOD

(71) Applicant: UNIVERSITY-INDUSTRY COOPERATION FOUNDATION OF KYUNG HEE UNIVERSITY, Yongin-si (KR)

(72) Inventors: Chang Ho Jihn, Seongnam-si (KR); Aida Guadalpe Mercado Hernandez, Yongin-si (KR)

(73) Assignee: UNIVERSITY-INDUSTRY COOPERATION FOUNDATION OF KYUNG HEE UNIVERSITY, Yongin-si (KR)

( * ) Notice: Subject to any disclaimer, the term of this patent is extended or adjusted under 35 U.S.C. 154(b) by 656 days.

(21) Appl. No.: 14/842,112

(22) Filed: Sep. 1, 2015

(65) Prior Publication Data

US 2016/0125306 A1    May 5, 2016

(30) Foreign Application Priority Data

Sep. 1, 2014   (KR) .................. 10-2014-0115754
Sep. 1, 2015   (KR) .................. 10-2015-0123871

(51) Int. Cl.
    *G06N 7/00*    (2006.01)

(52) U.S. Cl.
    CPC .................. *G06N 7/005* (2013.01)

(58) Field of Classification Search
    CPC ........ G06N 99/005; G06N 7/005; G06N 7/00; G06N 5/22; G06N 5/04; G06N 3/08; G06F 17/30598; G06Q 10/0635
    See application file for complete search history.

(56) References Cited

U.S. PATENT DOCUMENTS

2009/0062624 A1*  3/2009  Neville .................. G06Q 50/22
                                              600/300

FOREIGN PATENT DOCUMENTS

KR   10-2011-0043277 A     4/2011
WO   WO 2006/119437 A2    11/2006

OTHER PUBLICATIONS

Dobson, Michael. Dobson, Deborah Singer. Project Risk and Cost Analysis. Aug. 15, 2011.*

(Continued)

*Primary Examiner* — Paulinho E Smith
(74) *Attorney, Agent, or Firm* — NSIP Law

(57) ABSTRACT

An apparatus for assessing goal attainment may include a preprocessor configured to define a goal of process, all probable final results, attributes, a process execution period, and time points of assessment, acquire or check attribute values from one or more historical process instances that match the defined goal of process, all the defined probable final results, the defined attributes, the defined process execution period, and the defined time point of assessment, and extract one or more event profiles from the attribute values of the process instances; and a likelihood calculator configured to calculate prior and posterior probabilities of an ongoing process instance based on the extracted event profiles, and calculate a probability that the ongoing process instance attains each probable final result according to each time point, using the calculated prior and posterior probabilities at the defined time point of assessment.

20 Claims, 7 Drawing Sheets

(56) References Cited

OTHER PUBLICATIONS

IBM Technical Disclosure Bulletin. Design and Construction of an Idiot-System for Determining one Sequence from Another. Mar. 1, 1990. Issue No. 10B. vol. 32. p. 93-95.*

Hernandez, A., "Likelihood-based Bayesian Method for Assessing Process Risk in Real Time," Thesis. Department of Industrial and Management Systems Engineering, Kyung Hee University, 2011 (54 pages).

* cited by examiner

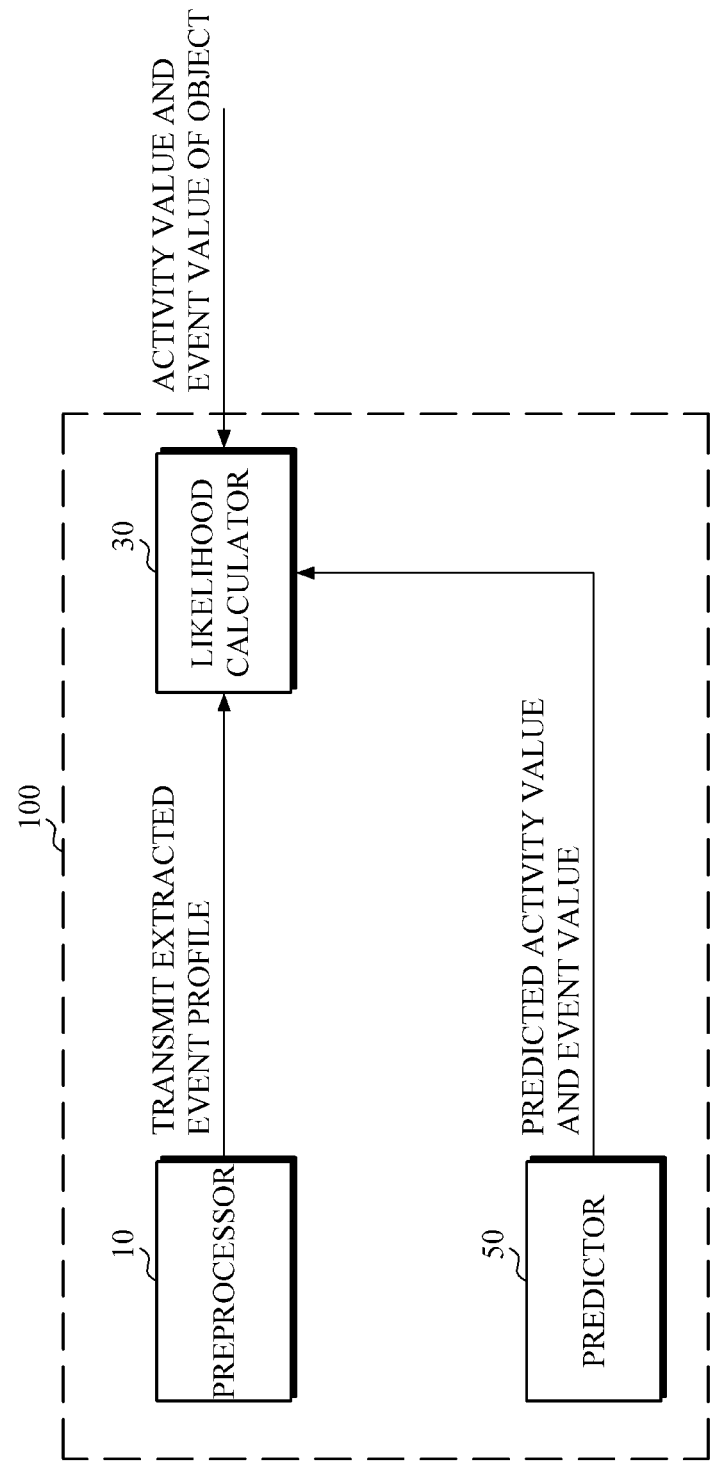

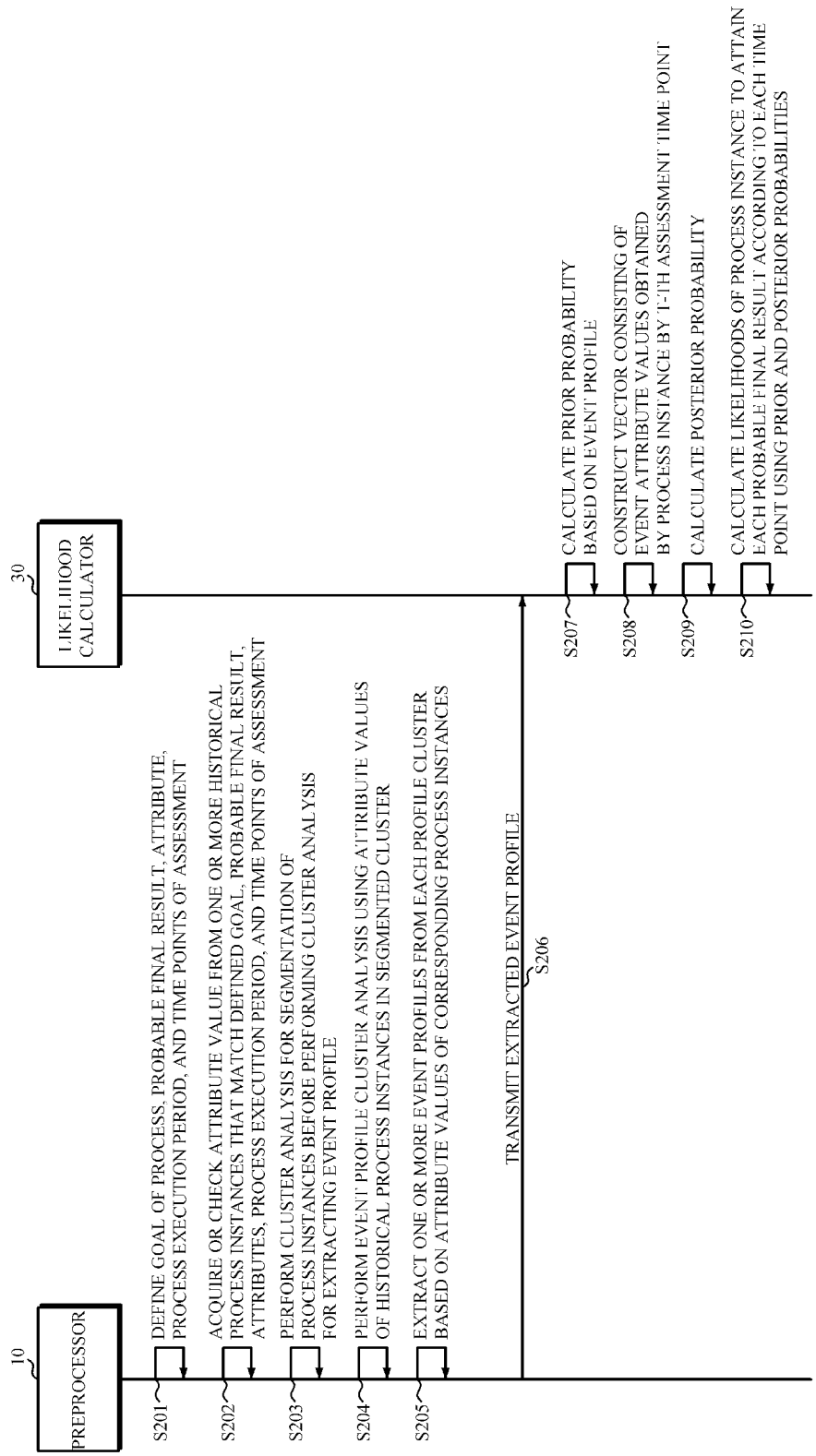

GOAL-ATTAINMENT ASSESSMENT APPARATUS AND METHOD

CROSS-REFERENCE TO RELATED APPLICATION(S)

This application claims priority from Korean Patent Application Nos. 10-2014-0115754, filed on Sep. 1, 2014, and 10-2015-0123871, filed on Sep. 1, 2015, in the Korean Intellectual Property Office, the disclosures of which are incorporated herein by references in its entirety.

BACKGROUND

1. Field

The following description relates to a prediction method, and more particularly, to a method for predicting and assessing a task execution progress.

2. Description of the Related Art

Various technologies for predicting results from multiple processes and for predicting what actions will need to be taken at particular future times have been developed. A prediction technique that is widely used is the Bayesian theorem, for which, in the manufacturing sector, the Bayesian theorem is used for quality control of products by predicting error rates, and for prediction in other sectors, such as weather forecasting and clinical trials. Bayesian-theorem-based prediction techniques and their application are not exclusive to the sectors mentioned above, but may also be utilized in the field of predicting an individual's behaviors, goals, or an action taken at a particular future time. The existing prediction techniques, however, do not allow a high level of accuracy, nor do they include specified algorithms for prediction.

Korean Patent Publication No. 10-2001-0043277 discloses a technology for predicting a failure in each component of a power plant. The aforesaid technology builds a database regarding a history of failures in each component of the power plant, and predicts a failure rate thereof based on the Bayesian statistical method. However, said technology applies the Bayesian statistical method to only predict the occurrence of failures, and does not utilize it in the application of behavior prediction or prediction at specific points in time.

SUMMARY

The present disclosure provides an assessment apparatus and an assessment method, which make possible the predicting of time-specific activities that must take place in order to accomplish a task goal, predicting event attribute values, as well as calculating the likelihood of all final results.

Provided here in one general aspect of the present disclosure is an apparatus for assessing goal attainment, including: a preprocessor and a likelihood calculator. The preprocessor is configured to define a goal of a process, all probable final results, attributes, a process execution period, and time points of an assessment; acquire or check attribute values from one or more historical process instances that match the defined goals of a process, all the defined probable final results, the defined attributes, the defined process execution period, and the defined time points of an assessment; and extract one or more event profiles from the attribute values of the process instances. Furthermore, a likelihood calculator configured to calculate prior and posterior probabilities of an ongoing process instance based on the extracted event profiles, and calculate likelihoods that an ongoing process attains each of the probable time-specific final results, using the calculated prior and posterior probabilities at the defined time point of assessment.

The attributes of a process instance may include at least one or more of an environmental attribute, an object attribute, an activity attribute, and an event attribute. The preprocessor may create clusters of the historical process instances by performing cluster analysis based on at least one attribute chosen out of one or more activity attributes or one or more event attributes; and extract, from each of the created clusters, one or more event profiles, each consisting of attribute values of the historical process instances belonging to each of the clusters. This cluster analysis may be referred to as an "event profile cluster analysis," and the resulting clusters may be referred to as "profile clusters."

The likelihood calculator may calculate the prior probability that the ongoing process instance corresponds to each of the extracted event profiles; calculate the posterior probability by applying a likelihood function to the calculated prior probability; and calculate, by applying Bayesian theorem to the calculated prior and posterior probabilities, likelihoods of the ongoing process instance to attain each probable final result according to each time point.

Provided here in another general aspect of the present disclosure, is a method for assessing goal attainment, including: defining the goal of a process, all probable final results, attributes, a process execution period, and time points of an assessment; acquiring or checking attribute values from one or more historical process instances that match the defined goal of a process, all the defined probable final results, the defined attributes, the defined process execution period, and the defined time points of an assessment; extracting one or more event profiles from the attribute values of the historical process instances; calculating prior and posterior probabilities of an ongoing process instance based on the extracted event profile(s); and calculating likelihoods of the ongoing process instance to attain each probable final result according to each time point, using the calculated prior and posterior probabilities at the defined time point of assessment.

The attributes of the process instance may include at least one or more of an environmental attribute, an object attribute, an activity attribute, and an event attribute. The extracting of the event profiles from the attribute values of the historical process instances may include creating clusters of the historical process instances by performing cluster analysis based on at least one attribute chosen out of one or more activity attributes and one or more event attributes; and extracting, from each of the created clusters, one or more event profiles, each consisting of attribute values of the historical process instances belonging to each of the clusters.

In addition, the calculation of the prior and posterior probabilities based on the extracted event profiles may include: calculating a prior probability that the ongoing process instance corresponds to each of the extracted event profiles, and calculating the posterior probability by applying a likelihood function to the calculated prior probability. In calculating the likelihoods of the ongoing process instance to attain each probable final result according to each time point, Bayesian theorem may be applied to the calculated prior and posterior probabilities.

Other features and aspects will be apparent from the following detailed description, the drawings, and the claims.

BRIEF DESCRIPTION OF THE DRAWINGS

FIG. 1 is a diagram illustrating a configuration of an apparatus for assessing goal attainment according to an embodiment.

FIG. 2 is a flowchart illustrating processing procedures of an apparatus for assessing goal attainment according to an embodiment.

Figure 3A:
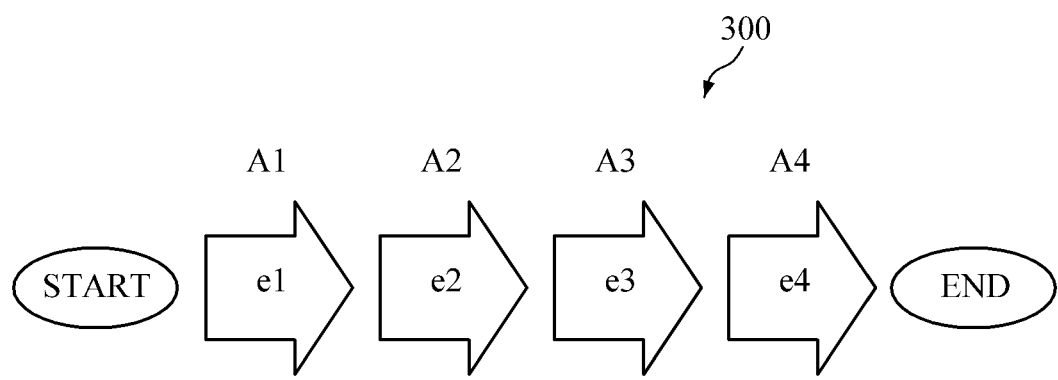
FIG. 3A is a diagram illustrating an example of a job-getting process carried out by an apparatus for assessing goal attainment according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

With respect to the outlook of the process, the apparatus disclosed here for assessing goal attainment uses a Bayesian probability calculation method based on a likelihood function to predict results. The apparatus for assessing goal attainment may predict an activity and an event of a process instance at each time point, and calculate likelihoods of the process instance to attain each probable final result at each time point. The process is a set of activities taken to accomplish a predetermined goal, in which the process is terminated once one out of various results has been achieved. Examples of a process may include a semiconductor manufacturing process, a bank deposit process, a diet process, a process of committing a crime (hereinafter, referred to as a "crime-committing process"), a life planning process, a process for getting a job (hereinafter, referred to as a "job-getting process"), a graduation process, etc. It is possible to improve process performance and reduce the loss of resources by detecting undesired situations early on in the course of the process. Also, it is possible to predict activities that are going to take place at a specific future time, thereby allowing preemptive measures to be taken against undesired situations.

FIG. 1 is a diagram illustrating a configuration of an apparatus for assessing goal attainment according to an embodiment.

Referring to FIG. 1, when each assessment time arrives, the apparatus 100 for assessing goal attainment predicts activities of a process instance to be taken at the following assessment times, and calculates likelihoods of the process instance to attain each of the probable final results.

TABLE 1

| | Definition of terms used in the disclosure |
|---|---|
| Process | Sequential activities to be taken in order to accomplish a specific goal |
| Process instance | Actual processing. (E.g., in the bank deposit process, a process instance refers to a sequence of actions taken by a customer who visits a bank, attempts to make the deposit, terminates the deposit process, and leaves the bank; each customer generates each instance). |
| Event | An outcome generated by each activity of a process instance while a process is being executed (E.g., in the bank deposit process, when a banker computerizes the deposit amount, events are generated, wherein the deposited amount and time of deposit are recorded in a database and the customer's account balance is updated). |
| Event profile | A pattern of sequential event values obtained while a process instance is being completed (E.g., in the bank deposit process, given that events under analysis are the time the customer visited the bank, amount deposited, waiting time, customer's ages, and success rate of deposit, an event profile may be as follows: the amounts deposited by male customers visiting between 10 a.m. and 11 a.m. range between 10,000,000 and 20,000,000 South Korean Won (KRW); the waiting times of said male customers range between 10 minutes and 20 minutes; the age range of said male customers is between 40 and 49; and the success rate of deposits made by the male customers whose deposits successfully undergone the deposit process and who leave the bank is between 80% and 90%). The event profile may be presented in as distributions (E.g., the amounts deposited by male customers visiting between 10 a.m. and 11 a.m. follow a normal distribution with a mean of 15,000,000 KRW and a standard deviation of 1,500,000 KRW; the average waiting time of said male customers follows a Poisson distribution with an average of 15 minutes; and the success rate of deposits follows a normal distribution with a mean of 85% and a standard deviation of 6%). |

A process may be a set of activities taken to achieve a predesignated goal. The process may be terminated once one out of various results has been achieved. Examples of a process may include a semiconductor manufacturing process, a bank deposit process, a diet process, a crime-committing process, a life planning process, a job-getting process, a graduation process, and the like. The apparatus 100 according to an embodiment may improve process performance and reduce the loss of resources by detecting undesired situations early on in the course of executing a process. Also, the apparatus 100 may predict activities to be taken at a specific future time-point, thereby allowing pre-emptive measures to be taken against undesired situations.

The apparatus 100 may be applicable to a variety of processes. For example, in the case of a diet process, a designated goal may be a specific amount of desired weight loss, and activities may include diet control, exercise, use of public transportation, sleep regulation, calorie intake control, participating in meetings encouraging/discouraging dieting, interacting with people who harbor a positive/negative attitude toward dieting, etc. In addition, the process' final result may vary depending on the goal of the process, in which the goal maybe a weight loss exceeds the goal weight, a weight loss that falls short of the goal weight, maintaining weight, gaining weight, and a loss in weight. Some activities associated with the process may be performed sequentially, concurrently, selectively, or repeatedly at regular intervals. The termination point of the process may vary depending on a process instance.

Another example of a process may be a job-getting process. Employment may be a designated as the goal, to which activities may include taking school courses at each semester, taking courses from private educational institutions, participating in contests, getting certifications or licenses, taking overseas language courses, participating in internship programs and field training, etc. A predicted result regarding the designated goal may be one of the following: being employed by a major company, being employed by a small or medium-sized business, entering a higher education institution, a failure in employment, or postponing graduation. In this example, the final result may be classified and defined into either "employed" or "unemployed".

A combination of activities performed in the process instance in an effort to achieve a goal may vary. Process instances that have achieved the goal of their respective process may have different values for the same events that they have executed. For example, in the job-getting process executed by university students aiming to be employed, two students who may have achieved the goal in which one may have a grade point average of 3.2 and have won a contest once, while the other may have a grade point average of 4.2 and have won a contest five times.

An assessment target object refers to an object that has completed one or more activities according to process execution procedures, is supposed to achieve one of many process results, and can be hence evaluated after the process execution period. For example, in the case of the job-getting process executed by university students aiming to be employed, the university students, who are the subjects executing the process, are the assessment target objects. An assessment target process instance refers to a process instance that completes one or more activities according to process execution procedures, achieves one of many process results, and can hence be assessed after the process execution period.

Figure 3B:
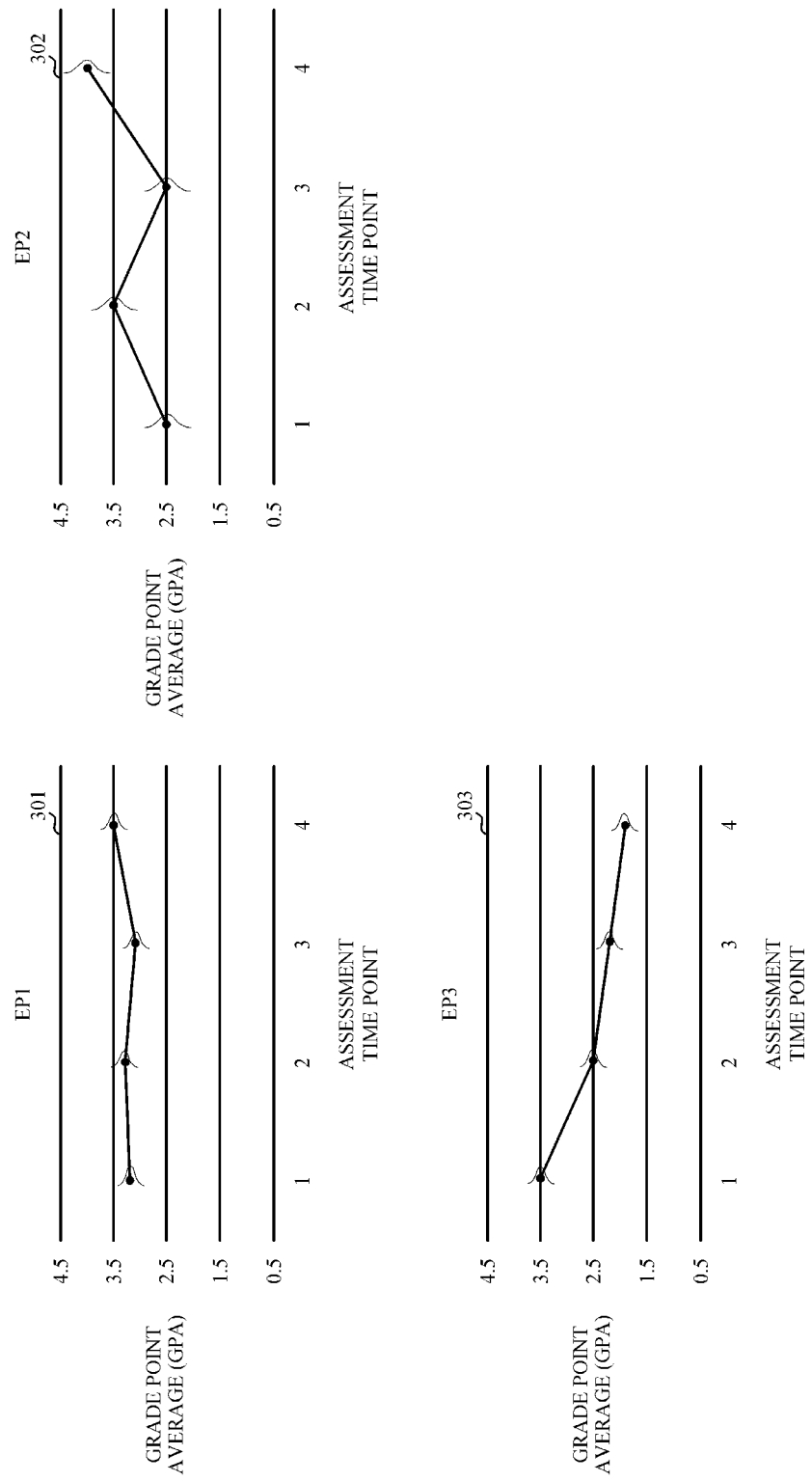
FIG. 3B illustrates graphs showing event attribute values considered in the process illustrated in FIG. 3A.

The apparatus 100 according to an embodiment calculates likelihoods of a process instance to attain each probable final result according to each time point. Likelihoods attaining each probable final result at each time point are defined as predicted probabilities of a process instance obtaining each probable final result which is estimated at the time of assessment before the process termination. FIGS. 3A and 3B, which will be described later, illustrate an example of a four-year long job-getting process; one year is considered one unit of time, so in said process, there would be four units, wherein the last day of each school year is defined as a time point of assessment. If we are to define the probable final result as either being "employed" or "unemployed", at the second assessment time point, which would be two years after the object started the process, a predicted probability of being employed and a predicted probability of being unemployed are the likelihoods of their corresponding process instance. As such, either "employed" or "unemployed" are the two probable final results that can be achieved at the time of termination of the process which would be two years later from the second assessment time point.

The apparatus 100 according to an embodiment includes a preprocessor 10 and a likelihood calculator 30.

The preprocessor 10 defines various factors of a process for which a prediction is made, wherein the factors may include the goal of a process, all probable final results, attributes, and a process execution period. In the present disclosure, a process refers to a set of activities performed to achieve specific goal for which predictions are to be made. Likelihoods of attaining each probable final result at each time point are measured over the period of process execution. The process execution period may be represented in units of time, such as hours, days, weeks, and months, where the standard unit of time is determined according to purpose and target of the process.

The preprocessor 10 may analyze collected statistical data and define the goal of process, a probable final result, attributes, a process execution period, and time points of an assessment. For example, activity attributes of the process may be defined through analyzing statistical data regarding employees, wherein the activity attributes may include whether a particular subject was taken, whether overseas language courses were taken, whether certifications are held, whether one has participated in a contest, and whether one has participated in an internship program. The preprocessor 10 may define event attributes of the process as grades earned during each school year, foreign language scores, certificates or licenses held, award winnings, and the number of times of participating in internship programs. Also, the preprocessor 10 may define all probable final results which may include being employed by a major company, being employed by a small or medium-sized business, and entering into the public service sector. But before that, the preprocessor 10 may receive data regarding the goal of a process, the probable final result, the attributes, the process execution period, and the time points of an assessment and define each of them respectively.

For example, in the case of a job-getting process, the preprocessor 10 may define the unit of time as a year in consideration of the four years that may be required for university graduation. It may specify the period of process execution to be equivalent to four units of time and may set the last day of each school year as the time of assessment.

Thereafter, the preprocessor 10 acquires or checks attribute values from one or more historical process instances that match the defined goal, all the defined probable final result, the defined attributes, the defined process execution period, and the defined time points of an assessment. The attribute values of the process instances to be used for analysis may include the past, present, and future attributes. The preprocessor 10 may perform analysis using only some attributes of the pertinent process. In the course of analysis, values for future attributes may be predicted or values determined at the present time may be used as future attributes for purpose of prediction. For example, the values already determined at the present time may include cumulative course credits and values related to policies which are going to be effective at the next time point of assessment, wherein the cumulative course credits are calculated by adding all course credits that a process instance will complete by the next time point of assessment, after the current semester for which the process instance may have registered for fifteen course credits. Future attributes that are not possible to be predicted or determined may be assigned a negligible value (null). The future attributes will be further described in connection with a predictor 50 which will be described later.

The attributes of the process instances may be classified into environmental attributes, object attributes, activity attributes, and event attributes. Object attributes are used to describe an object, which refers to a subject executing the process instance. For example, an object of the job-getting process instance would be a student aiming to be employed. The environmental attributes are used to describe an environment in which the object resides. The event attributes are related to a status of a process instance that is caused by an event, where the event is generated when the process instance executes activities. The event attributes are outcomes from performing activities in the environment. There are some attributes that have values that vary according to the time of assessment. For example, a grade point average at the time point of assessment one year before is a variable value relatively determined based on the current time point of assessment. Table 2 shows examples of attribute values of a process instance.

TABLE 2

Examples of process instance attributes

| Attribute classification | Examples of process instance attributes |
|---|---|
| Environmental attribute | Republic of Korea, historical data of annual employment rates, number of graduates in relevant year, number of graduates employed by companies within relevant year, cumulative number of the jobless, forecasted number of graduates of the following year, forecasted number of graduates who will be employed by companies in the following year, forecasted cumulative number of the jobless by the following year, etc. |
| Object attribute | Gender, age, hometown, parents' names, parents' educational backgrounds, parents' hometowns, past residence, past educational background, current level of education, intended level of education, and past family relations, present family relations, future family relations, school grade in the previous year, current school grade, school grade in upcoming year, demographical characteristics, social statistical characteristics, behavioral characteristics, etc. |
| Activity attribute | Whether items were purchased in the last month, whether items are purchased in the current month, whether items will be purchased in the following month, whether courses were taken in the last semester, whether courses are being taken in the current semester, prediction of whether to take courses in the following semester, whether one exercised yesterday, whether one is exercising currently, prediction of whether to exercise tomorrow, whether one had meals yesterday, whether one has meals today, prediction of whether to have meals tomorrow, whether one studied in the last semester, whether one is studying in the current semester, prediction of whether to study in the following semester |
| Event attribute | list of items purchased and kept two month ago, a list of items purchased and kept one month ago, list of items purchased and kept up until now, list of items predicted to be purchased and kept at the time point one month later, list of courses taken in the last semester, list of courses being taken in the current semester, list of courses predicted to be taken in the following semester, yesterday's workout duration, today's workout duration, tomorrow's predicted workout duration, yesterday's caloric intake, today's caloric intake, predicted caloric intake for tomorrow, aggregate time of study in the last semester, aggregate time of study in the current semester, and predicted aggregate time of study in the following semester, grade point average (GPA) at the time point one year ago, GPA of the previous semester, current GPA, predicted GPA for the following semester, award winnings at the time point one year ago, award winnings up until now, predicted award winnings next year, weight of one month ago, current weight, predicted weight next month, assessment at the last assessment time point as to whether a result was achieved, assessment at the current assessment time point as to whether a result has been achieved, prediction of whether a result will be achieved at the following assessment time point, type of result achieved at the last assessment time point, type of result achieved at the current assessment time point, type of result predicted to be achieved at the following assessment time point, list of keywords used at the last assessment time point, list of keywords being used at the current assessment time point, list of keywords predicted to be used at the following assessment time point, etc. |

The preprocessor 10 performs cluster analysis using the attribute values of a historical process instance for extracting an event profiles (EP). For analysis, the preprocessor 10 creates clusters of the historical process instance based on at least one attribute chosen out of one or more activity attributes and one or more event attributes, where the cluster is referred to as a "profile cluster" in the present disclosure. Here, the cluster refers to a group of process instances similar to each other in terms of attributes used for the cluster analysis. For example, in a case where cluster analysis for a job-getting process executed by university students is performed based on their grade point averages obtained at each time of assessment, the following three groups may be created: a group of process instances exhibiting a gradual increase in students' grade point averages; a group of process instances exhibiting a gradual decrease in students' grade point averages; and a group of process instances exhibiting steady grade point averages that only fluctuate within a certain range.

Also, the preprocessor 10 arranges, according to time sequence, one or more attribute values used for the cluster analysis. The process instances belonging to the same profile cluster may exhibit similarity in the time-sequentially arranged attribute values. The preprocessor 10 extracts one or more event profiles from each of the profile clusters based on the attribute values of the corresponding process instances. As defined in Table 1, the event profile is a pattern of sequential event attribute values obtained until a process instance is completed.

For example, in the case of the cluster of process instances exhibiting a gradual increase in students' grade point averages, the event profile may be defined so that the process instances have a grade point average range of 2.0 to 3.1 at the end of the first year, a grade point average range of 3.3 to 3.5 at the end of the second year, a grade point average range of 3.7 to 3.8 at the end of the third year, and a grade point average range of 4.0 to 4.2 at the end of the fourth year. The preprocessor 10 performs the profile cluster analysis, and extracts the event profiles from each of the profile clusters resulting from the profile cluster analysis. These operations will be described in detail with reference to FIGS. 3A and 3B. The preprocessor 10 transmits the extracted event profiles to the likelihood calculator 30.

Table 3 shows definitions of variables that are used for the likelihood calculator 30 to calculate the likelihoods of a process instance to attain each probable final result which obtains only one event value at each time of assessment. In other words, the likelihoods of attaining each one of that the number of process event attributes is equal to the number of times of assessment, and each event attribute can obtain only one value at each time of assessment. However, as shown in Table 3, the process that obtains only one event value at each time of assessment is provided for the purpose of example only, and aspects of the present disclosure are not limited thereto, such that one or more attribute values may be obtained at each time of assessment.

TABLE 3

Definition of variables

| Terms | Definition |
|---|---|
| L | Length of project |
| I | Ongoing process instance |
| n | The number of event profiles generated by event values of each activity that is generated by process instance I |
| m | Total number of all probable final results |
| $A_t$ | t-th activity, t is an integer and satisfies $1 \leq t \leq L$ |
| $e_t$ | t-th event, t is an integer and satisfies $1 \leq t \leq L$ |
| $O_i$ | i represents a specific type of probable final result, where i is an integer and satisfies $1 \leq i \leq m$ |
| $EP_j$ | j-th event profile, j is an integer and satisfies $1 \leq j \leq n$ |
| ATP | Abnormal termination probability |
| t | t-th assessment, t is an integer and satisfies $1 \leq t \leq L$ |
| $d_t$ | Event values generated by activities taken at t-th assessment time point |
| $D_t$ | A set of event values generated by activities of process instance I and obtained until t-th assessment time point $D_t = \{d_1, d_2, \ldots, d_t\}$ For example, in the case of a job-getting process of a university student in which only one event, i.e., a grade point average, is generated and assessment is to be performed at the end of each school year, $D_t$ which is obtainable at the third assessment time point may be defined as a vector that consists of a grade point average at the end of the first year, a grade point average at the end of the second year, and a grade point average at the end of the third year. |

The likelihood calculator 30 estimates a prior probability to calculate likelihoods to attain each probable final result according to each time point. First, the likelihood calculator 30 calculates a prior probability of a process instance belonging to each of one or more event profiles extracted by the preprocessor 10.

$$P(I \in EP_k) = \frac{n_k}{\sum_{j=1}^{n} n_j} = \frac{n_k}{N} \quad (1)$$

The likelihood calculator 30 may calculate the prior probability using Equation 1. In Equation 1, N denotes the total number of process instances I to be analyzed, $n_k$ denotes the number of process instances belonging to the k-th event profile, and $P(I \in EP_k)$ denotes a prior probability of a process instance I belonging to the k-th event profile. Given that an event attribute value of a process instance is obtained at each time of assessment while a process is being executed and the event attribute values obtained until the t-th assessment time point construct a vector $D_t$, the preprocessor 10 calculates a posterior probability of the process instance belonging to the k-th event profile using Equation 2.

$$P(I \in EP_k \mid D_t) = \frac{P(I \in EP_k \cap D_t)}{P(D_t)} \quad (2)$$

$$= \frac{P(D_t \mid I \in EP_k) \times P(I \in EP_k)}{P(D_t)}$$

$$= \frac{P(D_t \mid I \in EP_k) \times P(I \in EP_k)}{\sum_{j=1}^{n} P(D_t \mid I \in EP_j) \times P(I \in EP_j)}$$

Calculation using Equation 2 is performed as follows: a prior probability $P(I \in EP_j)$ of a process instance belonging to the j-th event profile ($EP_j$) is calculated for all possible values of j. j is an integer, and satisfies $1 \leq j \leq n$.

If a process instance I belongs to the j-th event profile ($EP_j$), the probability of vector $D_t$ being constructed may be calculated using a likelihood function like Equation 3, whereby probability would be calculated for all possible values of j.

$$P(D_t \mid I \in EP_j) = \prod_{p=1}^{t} f(d_r \mid I \in EP_j) \quad (3)$$

In equation 3, represents the probability that $d_r$ is generated as an event attribute value at an assessment time point r when a process instance I belongs to the j-th event profile ($EP_j$). This probability is calculated for all previous assessment time points including the assessment time point t, and $P(D_t \mid I \in EP_j)$ is computed by multiplying the calculated probabilities. By using the probabilities $P(I \in EP_j)$ and $P(D_t \mid I \in EP_j)$ which are calculated through the aforesaid procedures based on the Bayesian Theorem, $P(I \in EP_k \mid D_t)$ in Equation 2 can be obtained. This probability is calculated for all possible values of k. k is an integer and satisfies $1 \leq k \leq n$.

Once the prior and posterior probabilities are calculated using Equations 1 to 3, the likelihood calculator 30 calculates the likelihoods of a process instance to attain each of the probable final results at the t-th assessment time point, using the calculated prior and posterior probabilities. For example, if the final result of the job-getting process is classified into two types: normal termination indicating success in employment and abnormal termination indicating failure in employment, one likelihood of a process instance's probable final result may be an abnormal termination probability (ATP), which is a probability of the process instance failing to be employed and is estimated at the time of process termination. Here, by focusing on the abnormal termination probability, early detection of an undesired situation during the execution of process is possible, thereby improving process performance and reducing the loss of resources.

Equation 4 represents a generalized equation for calculating likelihoods of a process instance to attain each of the probable final results when the process instance, depending on its necessity, belongs to one of n number of event profiles at the assessment time point t. In Equation 4, $O_i$ denotes the i-th type of probable final result. The calculator 30 may calculate likelihoods of the process instance to attain each probable final result according to each time point, using Equation 4.

$$P(O_i \mid D_t) = \sum_{j=1}^{n} P(I \in EP_j \mid D_t) P(O_i \mid I \in EP_j \cap D_t) \quad (4)$$

In Equation 4, $P(O_i \mid D_t)$ is a probability that a final result is of the i-th type at the time of process termination if event values obtained until the assessment time point t construct a vector $D_t$. $P(I \in EP_j \mid D_t)$ is a probability that a process instance I belongs to the j-th event profile ($EP_j$) if event values that have been obtained until the assessment time point t construct a vector $D_t$, and $P(O_i \mid I \in EP_j \cap D_t)$ is a probability that a final result is $O_i$, which is the i-th type of probable final result, at the time of process termination if event values that have been obtained until the assessment time point t construct a vector $D_t$ and the process instance I belongs to the j-th event profile ($EP_j$). $P(O_i \mid D_t)$ is calculated by acquiring the multiplication of $P(I \in EP_j \mid D_t)$ and $P(O_i \mid I \in EP_j \cap D_t)$ for all possible final results and summing up all multiplication results. Detailed procedures to derive Equation 4 will be described later with reference to FIGS. 3A and 3B.

The likelihood calculator 30 may calculate an expected probability of each of the probable final results for a case where various process execution periods occur. The process execution period may vary according to the purpose of assessment. For example, some students may be offered employment support by the fourth assessment time point, which some are offered by the fifth assessment time point. In this case, the probability of each of the final results may be calculated as below. To facilitate understanding of the explanation; it is assumed that L is aligned with a specific time of assessment. $P(O_{i,L} \mid D_{t,L})$ is a likelihood that a process instance to attain the i-th type of probable final result at the t-th assessment time point, wherein the likelihood is obtained by collecting data regarding historical process instances of a process having an execution period L. The likelihood calculator 30 may calculate an expected probability of the occurrence of the probable final result $O_i$, using Equation 5, based on $P(O_{i,L} \mid D_{t,L})$.

$$\Sigma_{L=T}^{\infty} P(\text{project\_length}=L \mid L \geq T) * P(O_{i,L} \mid D_{t,L}) \quad (5)$$

In Equation 5, T denotes a minimum project length, $P(\text{project\_length}=L \mid L \geq T)$ represents a probability that a process execution period of a process that is terminated at the T-th assessment time point or that a process execution period of a process whose process instance continues after the T-th assessment time point is L.

The apparatus 100 according to an embodiment may further include a predictor 50. The predictor 50 may predict an activity attribute value of a process instance to be obtained at each future assessment time point following the latest assessment time point t at which attribute values of the process instance are obtained, as well as predict an event attribute value to be obtained at each of the future time points. The apparatus 100 calculates the aforesaid probability using event profiles extracted from attribute values of a process instance and an extended vector $D_t$, consisting of previously obtained attribute values and predicted attribute values of the process instance. Accordingly, the apparatus 100 can calculate likelihoods that the process instance attains each of the probable final results at each time of assessment.

The predictor 50 may estimate predicted activity attribute values for future activities and predicted event attribute values for future events, using Equation 6.

$$s = \operatorname*{argmax}_{j} P(I \in EP_j \mid D_t) \quad (6)$$

Given that event attribute values obtained until the latest assessment time point t construct a vector $D_t$, the purpose of Equation 6 is to calculate a probability of a process instance I belonging to each event profile and thereby identify an event profile with the highest probability. For example, if $P(I \in EP_j | D_t)$ is highest when j=2, then s has 2 as its value. Based on this, it is assumed that the event attribute values to be obtained by the process instance I at future time points will be the most similar to the second event profile. Under this assumption, event attribute values at a specific future time point may be predicted by referencing a pattern of event attribute values to be obtained at said future time point of assessment which is defined by the second event profile. For example, an assumption is derived from Equation 6 that a process instance which reaches the third assessment time point will generate event attribute values that are the most similar to the second event profile at a future assessment, and, given that the second event profile specifies that event attribute values at the fourth assessment time point, which is an upcoming assessment time point, have a normal distribution with a mean of 50 and a standard deviation of 5, the mean of said normal distribution, i.e., 50, would be used as a predicted event value at the fourth assessment time point to calculate the likelihoods of the process instance to attain each of the probable final results.

A prediction of activities that a process instance will carry out at each time point refers to predicting a list of activities that would be performed until the following assessment time point after the current assessment has been completed. The prediction may include a prediction of whether a process instance will take a specific school subject, a prediction of whether a process instance will participate in a contest, a prediction of whether a process instance will get a certification or license, etc. In addition, the prediction of activities that a process instance will carry out at each time point relates to event attribute values that may be generated by activities that would be performed until the following assessment time point after the current assessment has been completed. Said prediction may include a prediction of a list of school subjects that may be taken, a prediction of a list of contests to participate in, and a prediction of a list of certification examinations to take, and the like. As such, it is possible to predict activities that are going to be performed by a process instance at a specific future time point, and thereby allowing preemptive measures to be taken against undesired situations.

The timing of assessment by the apparatus 100 may be a previously fixed time point or a time point when a particular event occurs. For example, the fixed assessment time point may be aligned with the unit time, whereby termination of each time unit is set as the assessment time point.

FIG. 2 is a flowchart illustrating processing procedures of an apparatus for assessing goal attainment according to an embodiment.

Referring to FIGS. 1 and 2, the preprocessor 10 defines various factors of a process for which predictions are made, wherein the factors may include a goal of a process, all probable final results, attributes, a process execution period, and time points of an assessment, as depicted in S201. The process is a set of activities taken to accomplish a predetermined goal for which predictions are to be made. Likelihoods of a process instance to attain each probable final result are measured over the period of process execution. The process execution period may be represented in units of time.

Then, the preprocessor 10 acquires or checks attribute values from one or more historical process instances that match the defined goals of a process, all the defined probable final results, the defined attributes, the defined process execution period, and the defined time points of an assessment, as depicted in S202. The attribute values of the process instances to be used for analysis may include the past, present, and future attributes. The preprocessor 10 may perform analysis using only some attributes of the pertinent process. In the course of analysis, values of future attributes may be predicted or values determined at the present time may be used as the future attributes for the purpose of prediction. The attributes of the process instances may be classified into environmental attributes, object attributes, activity attributes, and event attributes.

Once the attribute values of the process instances have been acquired, the preprocessor 10 may perform cluster analysis for segmentation of the process instances; said preprocessor 10 may then perform another cluster analysis for extracting event profiles, as depicted in S203. This cluster analysis may be referred to as "segmentation cluster analysis," and a resulting cluster may be referred to as a "segmented cluster." The preprocessor 10 may perform the segmentation cluster analysis using the acquired attribute values of the process instances before executing event profile cluster analysis, so as to create segmented clusters of process instances that have similar environmental attribute values or similar object attribute values. Then, the preprocessor 10 may perform the event profile cluster analysis on each of the segmented clusters to extract event profiles, so that the extracted event profiles can be more distinct from each other. Unlike the event profile cluster analysis that is made based on at least one attribute chosen out of one or more activity attributes and one or more event attributes, the cluster analysis for segmentation is made based on at least one attribute chosen out of one or more environmental attributes and one or more object attributes, so as to form clusters.

By segmentation cluster analysis, likelihoods of historical process instances are determined based on their environmental attributes or activity attributes and segmented clusters of similar process instances are formed before an event profile is extracted from the historical process instances. The segmentation cluster analysis is performed based on the fact that it is more efficient and effective to extract event profiles from each of the segmented clusters of similar process instances, for which the segmented clusters are made based on similar environmental attributes and object attributes, rather than to extract the event profiles from the whole group of process instances of various environmental attributes and object attributes. The segmentation cluster analysis by the preprocessor 10 may be optionally performed, as needed, before the event profile cluster analysis.

The preprocessor 10 performs event profile cluster analysis using the attribute values of the historical process instances in each of the segmented clusters, as depicted in S204. The preprocessor 10 creates clusters consisting of the historical process instances belonging to the same segmented cluster made in S203, based on at least one attribute chosen out of one or more activity attributes and one or more event attributes. Then, the preprocessor 10 arranges, according to time sequence, one or more attribute values used for the cluster analysis. The process instances belonging to the same profile cluster may exhibit similarity in the time-sequentially arranged attribute values. The preprocessor 10 extracts one or more event profiles from each of the profile clusters based on the attribute values of the corresponding process instances, as depicted in S205. The profile clusters indicate clusters resulting from the event profile cluster analysis in S204. Then, the preprocessor 10 transmits the extracted event profiles to the likelihood calculator 30, as depicted in S206.

In response to the event profiles being extracted by the preprocessor 10, the likelihood calculator 30 calculates a prior probability in order to calculate likelihoods of attaining each probable final result according to each time point, as depicted in S207. The likelihood calculator 30 may calculate a prior probability using Equation 1 that is described with reference to FIG. 1. Then, if an event attribute value of a process instance is obtained at each time of assessment while a process is being executed and the event attribute values obtained until the t-th assessment time point construct a vector $D_t$, as depicted in S208, the preprocessor 10 calculates a posterior probability of the process instance belonging to the k-th event profile using Equation 2, which is described with reference to FIG. 1, as depicted in S209.

Once the prior and posterior probabilities have been calculated, the likelihood calculator 30 calculates likelihoods of the process instance to attain each probable final result according to each time point, at the t-th assessment time point, using the calculated prior and posterior probabilities, as depicted in S210. The likelihood calculator 30 may calculate said likelihoods using Equation 4, which is described with reference to FIG. 1.

FIG. 3A is a diagram illustrating an example of a job-getting process carried out by an apparatus for assessing goal attainment according to an embodiment.

FIG. 3B illustrates graphs showing event attribute values considered in the process illustrated in FIG. 3A.

A job-getting process of a university student will be described with reference to FIGS. 3A and 3B. Under the assumption that a predetermined goal is to be employed, the apparatus 100 for assessing goal attainment may define the probable final results as being "employed" and "unemployed." As event attributes, the apparatus 100 may define whether courses were taken during the first year of university, whether course were taken during the second year, whether courses were taken during the third year, and whether course were taken during the fourth year. The apparatus 100 may also define, as event attributes, the grade point averages of each year of university (i.e., the first year, the second year, the third year, and the fourth year) and define the time unit since a duration of four years may be required for university graduation. Then, the apparatus 100 may set a process execution period to be four units of time, as well as specify the last day of each school year as the time of assessment. The above shows the intention of analyzing a probability of a student being employed by the fourth year from the time of university entrance. The apparatus 100 performs segmentation cluster analysis and event profile cluster analysis only with respect to particular historical process instances. For example, if the process execution period is four years, the particular historical process instances may be process instances that executed activities prior to times of assessment and obtained event attribute values at each time of assessment, hence allowing the process attainment thereof to be identified.

The apparatus 100 acquires attribute values from historical process instances that match the defined goal, all the defined probable final result, the defined attributes, the defined process execution period, and the defined time points of an assessment. In the course of analysis, values of future attributes may be predicted, or values determined at the present time may be used as the future attributes for the purpose of prediction. For example, the determined values may be cumulative course credits that a process instance will earn by the coming assessment time point after the current semester, for which the process instance may have registered for fifteen course credits, and values related to policies which are going to be effective in the coming assessment. Future attributes that are not possible to be predicted or determined may be assigned a negligible value (null).

It is assumed that the preprocessor 10 performs event profile cluster analysis on an object, "a university student," using the following event attributes, "a grade point average at the end of the first year of university," "a grade point average at the end of the second year of university," "a grade point average at the end of the third year of university," and "a grade point average at the end of the fourth year of university," according to the procedures as described with reference to FIGS. 1 and 2, and thereby obtains three profile clusters. Each of said profile cluster generates three event profiles as shown in Table 4 below, in which the grade point average is calculated based on 4.5 being the highest score. As shown in Table 4, there are four time points of assessment, and each time point of assessment is the last day of the second semester of each school year. The process instance's activity is "taking courses during each year," and an event value obtained from the activity may be a grade point average at the end of a corresponding year.

TABLE 4

| | Examples of event attribute values | | | | |
|---|---|---|---|---|---|
| | Event 1 | Event 2 | Event 3 | Event 4 | ATP |
| EP 1 | N(3.2, 0.01$^2$) | N(3.3, 0.01$^2$) | N(3.1, 0.01$^2$) | N(3.5, 0.01$^2$) | 20% |
| EP 2 | N(2.5, 0.02$^2$) | N(3.5, 0.02$^2$) | N(2.5, 0.02$^2$) | N(4.0, 0.02$^2$) | 30% |
| EP 3 | N(3.5, 0.01$^2$) | N(2.5, 0.01$^2$) | N(2.2, 0.01$^2$) | N(1.9, 0.01$^2$) | 90% |

The graphs of FIG. 3B shows a first event profile (EP 1), a second event profile (EP 2), and a third event profile (EP 3). The event profiles are obtained based on the four event attributes "a grade point average at the end of the first year of university," "a grade point average at the end of the second year of university," "a grade point average at the end of the third year of university," and "a grade point average at the end of the fourth year of university." The event attribute values of the historical process instances belonging to the same profile cluster have a normal distribution. In each graph of FIG. 3B, averages of the normal distributions of the event attribute values corresponding to assessment time points are time-sequentially connected to each other, and a normal distribution curve simply shows a pattern of change in the event attribute values of each profile process. The first event profile (EP 1), the second event profile (EP 2), and the third event profile (EP 3) correspond to a first EP graph 301, a second EP graph 302, and a third EP graph 303, respectively.

FIG. 3A illustrates a diagram of the above job-getting process. The job-getting process diagram 300 of FIG. 3A consists of four activities A1, A2, A3, and A4 in the form of a serial process. Each activity A1, A2, A3, and A4 generates one event e1, e2, e3, and e4, respectively. In the process, only three types of event profiles exist.

$A_i$ denotes an activity at the i-th school year, and e denotes a grade point average by the i-th school year. In Table 4, Event1 and Event 2 are event attributes, whereby Event 1 denotes a grade point average on the last day of the second semester of the first year, and Event2 denotes a grade point average on the last day of the second semester of the second year. ATP stands for an abnormal termination probability which indicates a probability of a process instance being terminated with an abnormal attainment after four years from the time of university entrance. Here, an example of the abnormal attainment is considered as a failure in employment. Hence, Table 4 indicates that a percentage of failure in employment according to the historical process instances that match the first event profile (EP 1) is 20%.

Values of Event3 in the first event profile (EP 1) have a distribution of $N(3.1.0.01^2)$. That is, at the time point of assessment, which is the last day of the second semester of the third year, grade point averages of historical process instances that belong to the first event profile (EP 1) have a normal distribution of a mean of 3.1 and a standard deviation of 0.01. In practice, if values do not follow any of the previously known distributions, they may be represented using an empirical distribution.

In the job-getting process example assuming that all probable final results are each classified as either normal termination or abnormal termination only, the apparatus 100 may calculate a likelihood of a process instance attaining a failure in employment, which is an ATP, at the t-th assessment time point, using Equation 7, based on Equation 4 described with reference to FIG. 1.

$$P(AT|D_t) = P(I \in EP_1|D_t)P(AT|I \in EP_1 \cap D_t) + \quad (7)$$
$$P(I \in EP_2|D_t)P(AT|I \in EP_2 \cap D_t) +$$
$$P(I \in EP_3|D_t)P(AT|I \in EP_3 \cap D_t)$$

Equation 8 to Equation 11 show procedures for deriving Equation 7.

$$P(AT) = P(I \in EP_1)P(AT|I \in EP_1) + \quad (8)$$
$$P(I \in EP_2)P(AT|I \in EP_2) + P(I \in EP_3)P(AT|I \in EP_3) =$$
$$P(I \in EP_1)\frac{P(AT \cap (I \in EP_1))}{P(I \in EP_1)} + P(I \in EP_2)$$
$$\frac{P(AT \cap (I \in EP_2))}{P(I \in EP_2)} + P(I \in EP_3)\frac{P(AT \cap (I \in EP_3))}{P(I \in EP_3)}$$
$$P(AT) = P(AT \cap (I \in EP_1)) + P(AT \cap (I \in EP_2)) +$$
$$P(AT \cap (I \in EP_3))$$

$$P(AT \cap D_t) = P(AT \cap D_t \cap (I \in EP_1)) + \quad (9)$$
$$P(AT \cap D_t \cap (I \in EP_2)) + P(AT \cap D_t \cap (I \in EP_3))$$

$$\frac{P(AT \cap D_t)}{P(d_t)} = \frac{P(AT \cap D_t \cap (I \in EP_1))}{P(d_t)} + \quad (10)$$
$$\frac{P(AT \cap D_t \cap (I \in EP_2))}{P(d_t)} + \frac{P(AT \cap D_t \cap (I \in EP_3))}{P(d_t)}$$

$$P(AT|D_t) = P(I \in EP_1|D_t)P(AT|I \in EP_1 \cap D_t) + \quad (11)$$
$$P(I \in EP_2|D_t)P(AT|I \in EP_2 \cap D_t) +$$
$$P(I \in EP_3|D_t)P(AT|I \in EP_3 \cap D_t)$$

In another example, using a similar method, a likelihood of being employed by a small or medium-sized company (Employed by Medium-Sized Company) may be estimated using Equation 12.

$$P(EmployedbyMeddiumSizedCompany|D_t) = P(I \in EP_1|D_t) \quad (12)$$
$$P(EmployedbyMeddiumSizedCompany|I \in EP_1 \cap D_t) +$$
$$P(I \in EP_2|D_t)P(EmployedbyMeddiumSizedCompany|$$

-continued
$$I \in EP_2 \cap D_t) + P(I \in EP_3|D_t)$$
$$P(EmployedbyMeddiumSizedCompany|I \in EP_3 \cap D_t)$$

Although the apparatus 100 as described with reference to FIGS. 3A and 3B classifies all probable final results as either normal termination or abnormal termination, aspects of the present disclosure are not limited thereto.

Figure 4A:
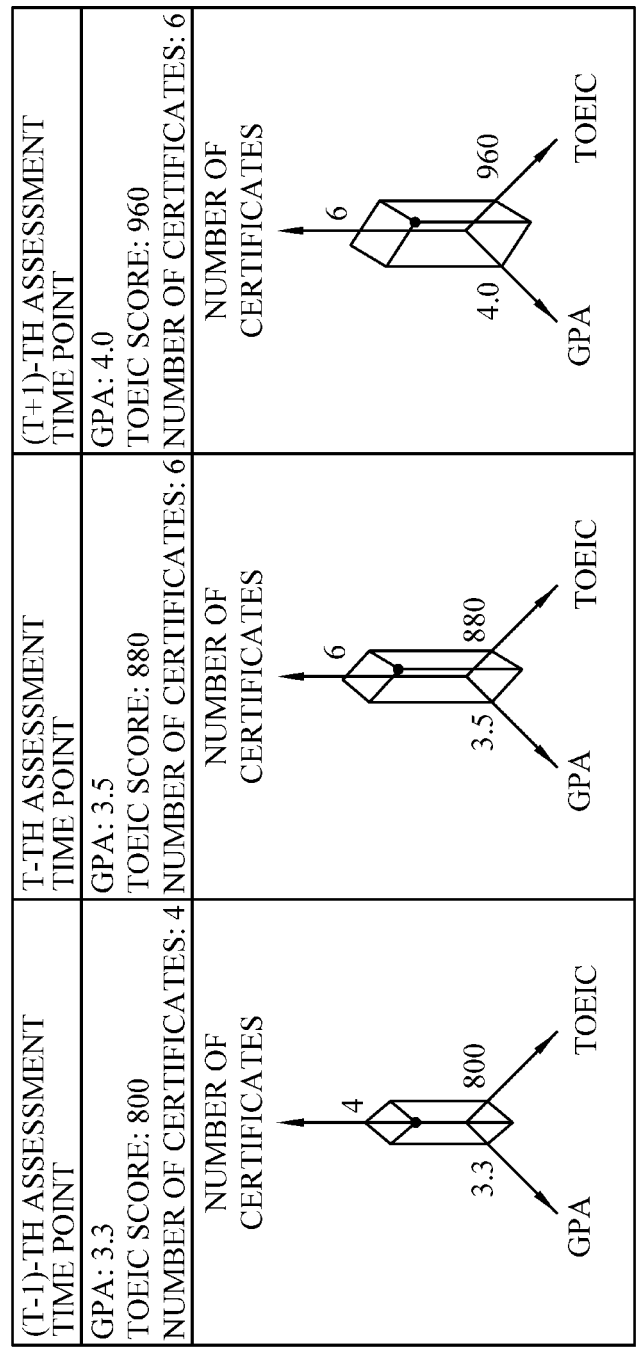
FIGS. 4A and 4B illustrate procedures for analyzing multiple events by the apparatus according to an embodiment.
Figure 4B:
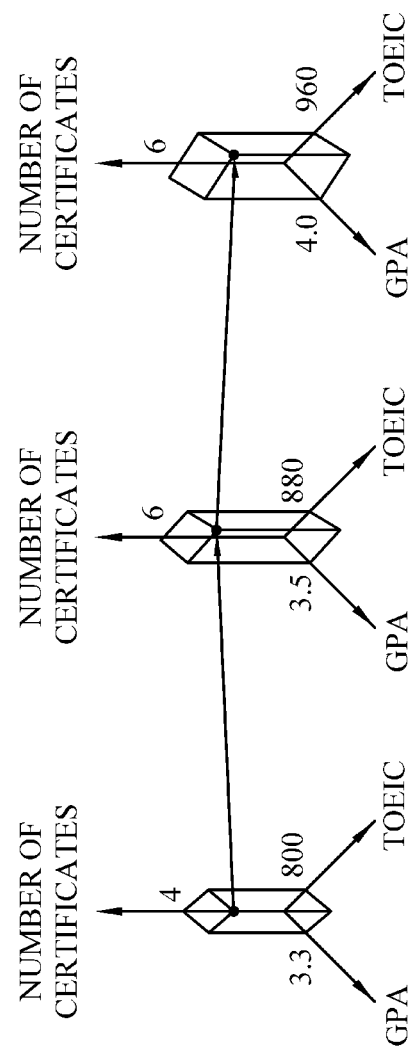

FIGS. 4A and 4B illustrate procedures for analyzing multiple events by the apparatus 100 according to an embodiment.

In an example described with reference to FIGS. 4A and 4B, one event is generated by one activity, but aspects of the present disclosure are not limited thereto, such that the apparatus 100 assesses goal attainment for one event attribute, as well as for two or more event attributes generated by each activity. In FIG. 4A, a total of three event attribute values, including a grade point average, the number of certificates, and TOEIC score, are obtained at each time of assessment.

FIGS. 4A and 4B illustrate changes in event attribute values according to assessment time. At the (t−1)-th assessment time point, a value of event attribute "grade point average" is 3.3, a value of event attribute "TOEIC score" is 800, and a value of event attribute "certificate score" is 4. At the t-th assessment time point, a value of event attribute "grade point average" is 3.5, a value of event attribute "TOEIC score" is 880, and a value of event attribute "certificate score" is 6. At the (t+1)-th assessment time point, a value of event attribute "grade point average" is 4.0, a value of event attribute "TOEIC score" is 960, and a value of event attribute "certificate score" is 6.

The apparatus 100 may assess the goal attainment, using all three event attributes. Two event attribute values obtained at a specific assessment time point construct a vector, and vectors obtained throughout the assessments may form one event profile. For example, when employment is designated as a process goal, the apparatus 100 may calculate a probability of failing to be employed by taking into consideration all three event attributes (e.g., the grade point average, the TOEIC score, and the number of certificates). Even in the case where two or more event attribute values are obtained at one time point, the apparatus 100 according to an embodiment may be applicable through modification, such as modification of dimensions. In addition, even in the case where two or more events occur at one point in time, the apparatus 100 can calculate all types of probabilities in the same manner as the case where a single event attribute value is obtained at one time point.

The apparatus 100, described with reference to FIGS. 1 to 4B, is applicable to various fields, as well as to the above job-getting process. The apparatus 100 may be appropriate for, such as a bank deposit process, a diet process, a crime-committing process, a life planning process, a job-getting process, a graduation process, a semiconductor manufacturing process, and a disease outbreak process.

For example, a disease outbreak process may be assessed by analyzing places visited by patients. Analysis may be performed under the definitions that a process execution period is five years, assessment is to be performed on the first day of every month, visiting a place is defined as an activity, and a type of place visited (e.g., food-related sites, fitness-related sites, stress-related sites, and the like) in a pertinent month, and types of diseases occurring are set as probable final results of the process.

Figure 5:
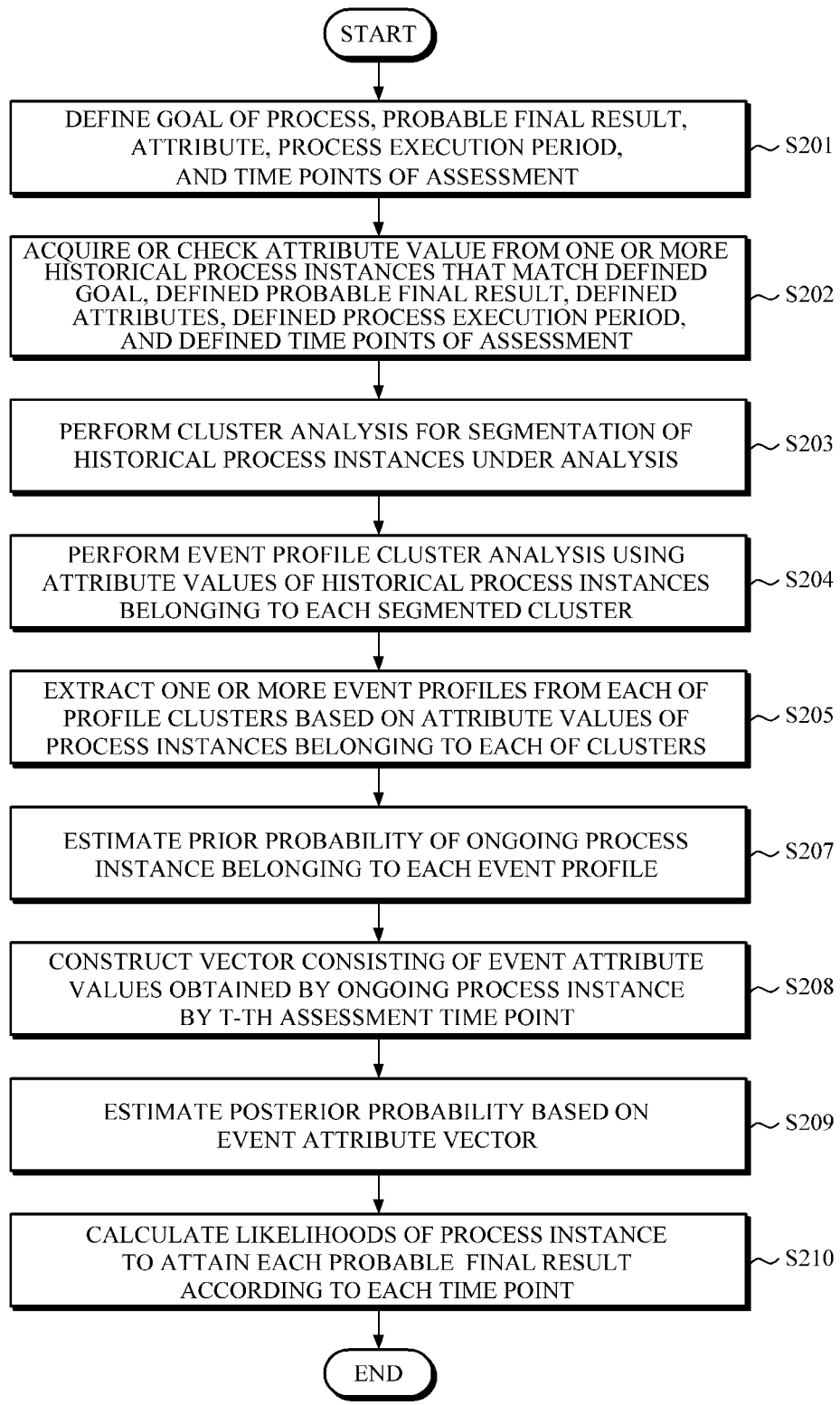
FIG. 5 is a flowchart illustrating a method for assessing goal attainment according to an embodiment.

FIG. 5 is a flowchart illustrating a method for assessing goal attainment according to an embodiment.

Referring to FIG. 5, the method for assessing goal attainment begins with defining various factors of a process for which predictions are made, wherein the factors may include a goal of a process, all probable final results, attributes, a process execution period, and time points of an assessment, as depicted in S201. The process is a set of activities taken to accomplish a predetermined goal for which predictions are to be made. Likelihoods of a process instance to attain each probable final result are measured over the period of process execution. The process execution period may be represented in units of time. Each time point of an assessment is set for measuring the likelihood of an object to attain each probable final result, and it may be either a past time-point or a present time-point. Also, the time point of an assessment may be a future time-point, as well as the past and present time-points.

Then, the apparatus acquires or checks attribute values from one or more historical process instances that match the defined goals, all the defined probable final result, the defined attributes, the defined process execution period, and the defined time points of an assessment, as depicted in S202. The attribute values of the process instances to be used for analysis may include the past, present, and future attributes. The preprocessor 10 may perform analysis using only some attributes of the pertinent process. In the course of analysis, values of future attributes may be predicted, or values determined at the present time may be used for the future attributes for purpose of prediction. The attributes of the process instances may be classified into environmental attributes, object attributes, activity attributes, and event attributes.

Once the attribute values of the process instances have been acquired, the apparatus may perform cluster analysis for segmentation of the process instances; said apparatus may then perform another cluster analysis for extracting event profiles, as depicted in S203. This cluster analysis may be referred to as "segmentation cluster analysis," and a resulting cluster may be referred to as a "segmented cluster." The apparatus may perform the segmentation cluster analysis using the acquired attribute values of the process instances, before executing event profile cluster analysis, so as to create segmented clusters of process instances that have similar environmental attribute values or similar object attribute values. Then, the apparatus may perform the event profile cluster analysis on each of the segmented clusters to extract event profiles, so that the extracted event profiles can be more distinct from each other.

Cluster analysis is performed based on at least one attribute chosen out of one or more environmental attributes and one or more object attributes, so as to create one or more clusters. The cluster analysis for segmentation may be optionally performed, as needed, before another cluster analysis for event profile is executed.

In S204, the apparatus performs cluster analysis using attribute values of historical process instances belonging to each segmented cluster. This cluster analysis is referred to as an "event profile cluster analysis" and a resulting cluster is referred to as a "profile cluster." If segmentation cluster analysis has been executed, the event profile cluster analysis is performed on the segmented clusters. Clusters of historical process instances under analysis are created based on at least one attribute chosen out of one or more activity attributes and one or more event attributes. Then, the apparatus arranges, according to time sequence, one or more attribute values used for the cluster analysis. The process instances belonging to the same cluster may exhibit similarity in the time-sequentially arranged attribute values. In S205, the apparatus extracts one or more event profiles from each of the profile clusters based on the attribute values of process instances belonging to each of said clusters.

In response to the event profiles being extracted, a prior probability of an ongoing process instance belonging to each event profile is calculated in order to calculate a likelihood that said process instance attains each probable final result, as depicted in S206. The prior probability may be calculated using Equation 1 described with reference to FIG. 1. Then, if an event attribute value of a process instance is obtained at each time of assessment while a process being executed and the event attribute values obtained until the t-th assessment construct a vector $D_t$, as depicted in S207, the preprocessor 10 calculates a posterior probability of the process instance belonging to the k-th event profile using Equation 2, which is described with reference to FIG. 1, as depicted in S208.

In response to the prior and posterior probabilities being estimated, at the t-th assessment, the apparatus calculates likelihoods of the process instance attaining each probable final result according to each time point, as depicted in S209.

The apparatus and method for assessing goal attainment predict an advancing direction of a process, thereby allowing for making a response in the early stage of the process. In addition, the apparatus and method are applicable to a statistical process control (SPC) system, allowing cost reduction and quality improvement in various manufacturing processes, as well as allowing preemptive measures to be taken against undesired situations in supermarket, hospital, and banking-related processes. Moreover, the apparatus and method are applicable to monitoring and evaluation of individuals' lives, thereby helping the individuals to improve their life projects.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling a process, comprising:
one or more processors configured to:
define a goal of the process, probable final results, attributes, a process execution period, and time points of an assessment;
acquire or check attribute values from one or more historical process instances that match the defined goal of the process, the defined probable final results, the defined attributes, the defined process execution period, and the defined time points of the assessment;
extract one or more event profiles from the attribute values;
calculate prior and posterior probabilities of an ongoing process instance based on the extracted one or more event profiles;
calculate likelihoods that an ongoing process attains each of the probable final results at each time point, using the calculated prior and posterior probabilities at the defined time points of the assessment; and
control the process based on at least one of the calculated likelihoods.

2. The apparatus of claim 1, wherein the attributes of the process instance comprise any one or any combination of any two or more of an environmental attribute, an object attribute, an activity attribute, and an event attribute.

3. The apparatus of claim 1, wherein the one or more processors are further configured to create clusters of the historical process instances by performing cluster analysis based on at least one attribute chosen out of one or more activity attributes and one or more event attributes, and to extract, from each of the created clusters, the one or more event profiles, each including attribute values of the historical process instances that belong to each of the clusters.

4. The apparatus of claim 1, wherein the one or more processors are further configured to calculate the prior probability that the ongoing process instance corresponds to each of the extracted one or more event profiles, to calculate the posterior probability by applying a likelihood function to the calculated prior probability, and to calculate, by applying Bayesian theorem to the calculated prior and posterior probabilities, the likelihoods.

5. The apparatus of claim 4, wherein the likelihoods are calculated according to $P(O_i|D_t) = \sum_{j=1}^{n} P(I \in EP_j|D_t) P(O_i|I \in EP_j \cap D_t)$, where $O_i$ is an i-th type of probable final result, $D_t$ is a set of one or more event values generated by one or more activities of a process instance I until a t-th assessment time point, $EP_j$ is a j-th event profile, and n is a number of the one or more event profiles.

6. The apparatus of claim 1, wherein in response to process execution periods being required for achieving the goal, with respect to each of the process execution periods, the one or more processors are further configured to acquire or check attribute values of historical process instances of each process associated with the possible process execution periods, and to calculate likelihoods of attaining each probable final result that corresponds to each of the process execution periods and a probability of occurrence of each of the process execution periods, and to calculate an expected probability that each probable final result occurs, based on the calculated likelihoods.

7. The apparatus of claim 6, wherein the expected probability that each probable final result occurs is calculated according to $\sum_{L=T}^{\infty} P(\text{project\_length}=L|L \geq T) * P(O_{i,L}|D_{t,L})$, where L is the process execution period, T is a minimum project length, $O_{i,L}$ is the i-th type of probable final result for the process execution period L, and $D_{t,L}$ is a set of one or more event values generated by one or more activities of a process instance I until the t-th assessment time point.

8. The apparatus of claim 1, wherein the one or more processors are further configured to predict an activity attribute value of the ongoing process instance to be obtained at a future assessment time point, and an event attribute value according to the activity, based on current activity attribute values and current event attribute values according to a current activity of the ongoing process instance.

9. The apparatus of claim 8, wherein an event profile type used to predict the activity attribute value and the event attribute value which is to be obtained at the future assessment time point is derived according to $$s = \underset{j}{\arg\max} P(I \in EP_j | D_t),$$

where $EP_j$ is a j-th event profile, I is an ongoing process instance, $D_t$ is a set of one or more event values generated by one or more activities of a process instance I until a t-th assessment time point, and s is one of j number of event profiles that creates the highest probability that the process instance I belongs to the event profile when event values obtained until the latest assessment time point t construct a vector $D_t$.

10. A non-transitory computer-readable storage medium storing instructions that, when executed by a processor, cause the processor to perform the method of claim 1.

11. A processor-implemented method for controlling a process, comprising:
 defining a goal of the process, probable final results, attributes, a process execution period, and time points of an assessment;
 acquiring or checking attribute values from one or more historical process instances that match the defined goal of the process, the defined probable final results, the defined attributes, the defined process execution period, and the defined time points of the assessment;
 extracting one or more event profiles from the attribute values;
 calculating prior and posterior probabilities of an ongoing process instance based on the extracted one or more event profiles;
 calculating likelihoods that the ongoing process instance attains each probable final result according to each time point, using the calculated prior and posterior probabilities at the defined time points of the assessment; and
 controlling the process based on at least one of the calculated likelihoods.

12. The method of claim 11, wherein the attributes of the process instance comprise any one or any combination of any two or more of an environmental attribute, an object attribute, an activity attribute, and an event attribute.

13. The method of claim 11, wherein the extracting of the one or more event profiles from the attribute values of the historical process instances comprises creating clusters of the historical process instances by performing cluster analysis based on at least one attribute chosen out of one or more activity attributes and one or more event attributes, and extracting, from each of the created clusters, the one or more event profiles, each including attribute values of the historical process instances that belong to each of the clusters.

14. The method of claim 11, wherein the calculating of the prior and posterior probabilities comprises:
 calculating the prior probability that the ongoing process instance corresponds to each of the extracted one or more event profiles, and
 calculating the posterior probability by applying a likelihood function to the calculated prior probability.

15. The method of claim 14, wherein the calculating of the likelihoods comprises applying Bayesian theorem to the calculated prior and posterior probabilities.

16. The method of claim 15, wherein the likelihood of the ongoing process instance is calculated according to $P(O_i|D_t) = \sum_{j=1}^{n} P(I \in EP_j|D_t) P(O_i|I \in EP_j \cap D_t)$, where $O_i$ is an i-th probable final result, $D_t$ is a set of one or more event values generated by one or more activities of a process instance I until a t-th assessment time point, $EP_j$ is a j-th event profile, and n is a number of the one or more event profiles.

17. The method of claim 11, further comprising:
 in response to process execution periods being required for achieving the goal, with respect to each of the process execution periods, acquiring or checking attribute values of historical process instances of each of processes associated with the possible process execution periods and calculating likelihoods of attaining each probable final result that corresponds to each of the process execution periods and a probability of occurrence of each of the process execution periods; and calculating an expected probability that each probable final result occurs, based on the calculated likelihoods of attaining each probable final result and a probability of occurrence of each of the process execution periods.

18. The method of claim 17, wherein the expected probability that each probable final result occurs is calculated according to $\Sigma_{L=T}^{\infty} P(\text{project\_length}=L|L \geq T) * P(O_{i,L}|D_{t,L})$, where L is the process execution period, T is a minimum project length, $O_{i,L}$ is an i-th type of probable final result for the process execution period L, and $D_{t,L}$ is a set of one or more event values generated by one or more activities of a process instance I until a t-th assessment time point.

19. The method of claim 11, further comprising:
predicting an activity attribute value of the ongoing process instance to be obtained at a future assessment time point, and an event attribute value according to the activity, based on current activity attribute values and current event attribute values according to one or more current activities of the ongoing process instance.

20. The method of claim 19, wherein an event profile type used to predict the activity attribute value and the event attribute value which is to be obtained at the future assessment time point is derived according to $$s = \underset{j}{\operatorname{argmax}} P(I \in EP_j | D_t),$$

where $EP_j$ is a j-th event profile, I is an ongoing process instance, $D_t$ is a set of one or more event values generated by one or more activities of a process instance I until a t-th assessment time point, and s is one of j number of event profiles that creates the highest probability that the process instance I belongs to the event profile when event values obtained until the latest assessment time point t construct a vector $D_t$.

* * * * *